United States Patent [19]

Baggett

[11] 4,020,045
[45] Apr. 26, 1977

[54] PROCESS FOR CONTROLLING THE MOLECULAR WEIGHT OF AROMATIC POLYCARBONATES

[75] Inventor: Joseph M. Baggett, Freeport, Tex.

[73] Assignee: The Dow Chemical Company, Midland, Mich.

[22] Filed: Feb. 26, 1976

[21] Appl. No.: 661,672

[52] U.S. Cl. .......................................... 260/47 XA
[51] Int. Cl.² ........................................ C08G 17/13
[58] Field of Search .......... 260/47 XA, 45.7 S, 463

[56] References Cited
UNITED STATES PATENTS 2,970,131  1/1961  Moyer et al. ................. 260/47 XA
3,035,020  5/1962  Fry ............................... 260/47 XA
3,897,391  7/1975  Jaquiss ......................... 260/47 XA

*Primary Examiner*—Theodore E. Pertilla
*Attorney, Agent, or Firm*—Benjamin G. Colley

[57] ABSTRACT

Process for the preparation of aromatic polycarbonates by the interfacial technique wherein the molecular weight is controlled by adding an effective amount of metallic sulfites to the polymerization reaction. The metallic sulfites are exemplified by alkali metal sulfites, pyrosulfites and hyposulfites.

6 Claims, No Drawings

PROCESS FOR CONTROLLING THE MOLECULAR WEIGHT OF AROMATIC POLYCARBONATES

BACKGROUND OF THE INVENTION

This invention relates to a method of controlling the molecular weight of polycarbonates prepared by the interfacial technique by adding certain metallic salts to the reaction media.

It is known from U.S. Pat. No. 3,035,020 that neutral inorganic salts such as sodium sulfate, sodium carbonate, potassium chloride, etc. can be added to an interfacial polymerization process to make aromatic polycarbonates from dihydric phenols and phosgene whereby the solubility of the the organic phase and the water phase in each other is substantially lessened.

It is further known from the Russian Pat. No. 149,222 to Tarasov, et al. that sodium sulfite or sodium dithionite can be used in this same type of reaction to stabilize the dihydric phenol and thus prevent or lessen discloration of the final polycarbonate resin.

SUMMARY OF THE INVENTION

It now has been discovered that the molecular weight of the thermoplastic aromatic polycarbonates can be controlled in process for preparing these under interfacial polycarbonate forming conditions wherein the following are reacted:
1. a carbonyl halide,
2. a dihydric phenol or mixtures of dihydric phenols,
3. a catalyst useful to form polycarbonates and
4. a chain terminating amount of a compound having one of the formulas

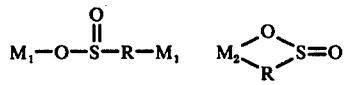

wherein $M_1$ is a metal of Group IA, $M_2$ is a metal of Group IIA, R is

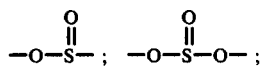

or —O—.

The process is thus useful to make thermoplastic polycarbonates without the need for the usual organic chain terminators such as tertiary butyl phenol and phenol. The polycarbonates prepared can have almost any molecular weight but preferably have a weight average molecular weight range from about 10,000 to about 60,000 as measured by gel permeation chromatography.

DETAILED DESCRIPTION

The process of this invention is carried out by first reacting and stirring a dihydric phenol compound such as bisphenol A with an aqueous caustic solution made from sodium or potassium hydroxide having a pH greater than 9 and preferably in the pH range from 9–13 wherein the aqueous compound having one of the formulas

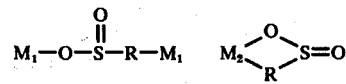

wherein $M_1$ is a metal of Group IA, $M_2$ is a metal of Group IIA, R is

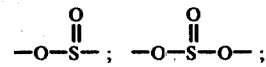

or —O—.

The above Group IA and IIA refer to H. G. Deming's Periodic Chart of the Elements.

For the purpose of this invention a chain terminating amount of the above inorganic compounds is defined as that amount wherein the weight percent range of the chain terminator to the dihydric phenol is in the range from about 1.0 to about 25 and preferably in the range from about 3.0 to about 15.0 especially where a metallic salt of Group IA is used.

A catalytic quantity, i.e., about 0.5 to about 2.0 weight percent based on the dihydric phenol of a polycarbonate catalyst such as a quaternary amine or a tertiary amine catalyst is then added to the reactants together with 5–10 moles of a halogenated solvent such as methylene chloride. Suitable catalysts are triethylamine, N,N-dimethylcyclohexylamine, tetramethyl ammonium hydroxide, triethyl benzyl ammonium hydroxide, benzyl trimethyl ammonium chloride, and the like.

The catalyzed reactants are stirred and allowed to react for about 0.25 to about 3 hours at a temperature of about 20° to about 40° C.

Suitable chain terminating compounds within the scope of the above formulas are, for example, lithium, potassium, or sodium sulfites, pyrosulfites, and hyposulfites, as well as the corresponding magnesium, calcium, strontium or barium salts. It is preferred to use alkali metal sulfites since they are cheaper and more effective in this regard.

The dihydric phenols employed in the practice of this invention are known dihydric phenols in which the sole reactive groups are the two phenolic hydroxyl groups. Some of these are represented by the general formula

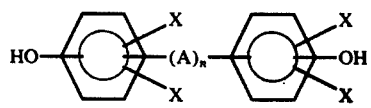

wherein A is a divalent hydrocarbon radical containing 1–15 carbon atoms, —S—, —S—S—,

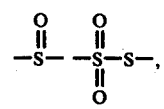

—O—, or

X is independently hydrogen, chlorine, bromine, fluorine, or a monovalent hydrocarbon radical such as an alkyl group of 1–4 carbons, an aryl group of 6–8 carbons such as phenyl, tolyl, xylyl, an oxyalkyl group of 1–4 carbons or oxyaryl group of 6–8 carbons and $n$ is 0 or 1.

One group of suitable dihydric phenols are those illustrated below:

1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenol)heptane
3,3-bis(3-methyl-4-hydroxyphenyl)hexane
3,3-bis(3,5-dibromo-4-hydroxyphenyl)pentane
2,2-bis(3,5-difluoro-4-hydroxyphenyl)butane
2,2-bis(4-hydroxyphenyl)propane (Bis A)
1,1-bis(3-methyl-4-hydroxyphenyl)ethane
1,1-bis(4-hydroxyphenyl)methane.

Another group of dihydric phenols useful in the practice of the present invention include the dihydroxyl diphenyl sulfoxides such as for example:

bis(3,5-diisopropyl-4-hydroxyphenyl)sulfoxide
bis(3-methyl-5-ethyl-4-hydroxyphenol)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxyaryl sulfones such as, for example:

bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric phenols useful in the practice of the invention includes the dihydroxydiphenyls:

3,3′, 5,5′-tetrabromo-4,4′-dihydroxydiphenyl
3,3′-dichloro-4,4′-dihydroxydiphenyl  3,3′-diethyl-4,4′-dihydroxydiphenyl
3,3′-dimethyl-4,4′-dihydroxydiphenyl
p,p′-dihydroxydiphenyl.

Another group of dihydric phenols which may be used in the practice of the invention includes the dihydric phenol ethers:

bis(3-chloro-5-methyl-4-hydroxyphenyl)ether
bis(3,5-dibromo-4-hydroxyphenyl)ether
bis(3,5-dichloro-4-hydroxyphenol)ether
bis(3-ethyl-4-hydroxyphenyl)ether
bis(3-methyl-4-hydroxyphenyl)ether
bis(4-hydroxyphenyl)ether.

A further group of dihydric phenols outside the scope of the above generic formula which may be used in the practice of the invention includes the dihydroxy benzenes, and the halo- and alkylsubstituted dihydroxy benzenes, such as, for example, resorcinol, hydroquinone, 1,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimethylbenzene, 1,4-dihydroxy-2-bromo-3-propylbenzene.

Other dihydric phenols of interest include the phthalein type bisphenols which are disclosed in U.S. Pat. Nos. 3,035,021; 3,036,036; 3,036,037; 3,036,038; 3,036,039.

It is, of course, possible to employ a mixture of two or more different dihydric phenols in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromide, carbonyl chloride and carbonyl fluoride.

The recovery of the polycarbonate is accomplished by decanting the aqueous layer, treating the remaining halogenated solvent with a strong aqueous acid solution (pH 1–3) such as hydrochloric or sulfuric acid solution, to neutralize the NaOH or KOH and washing with distilled water.

Finally, the polymer is precipitated from the solvent solution by pouring it into an excess of a nonsolvent for the polymer such as hexane, ethanol, petroleum ether, etc. The white precipitated polymer is then filtered, water washed and dried in a vacuum.

EXAMPLE 1

Into a 2.0 liter flask fitted with stirrer, thermometer, sparger tube, and reflux condenser, were charged the following: 75 mm of p-bisphenol A, 3.0 gms anhydrous sodium sulfite, and 276 gms of distilled water. The contents were stirred and nitrogen purged for about 5 minutes at 25° C. Then, 34 ml of a 35% caustic solution were added. The caustic solution contained 37.5 gms 98.8% sodium hydroxide pellets and 69.7 gms of distilled water, measuring a volume of 81 ml. The contents were allowed to stir, with a slight $N_2$ purge, for 5 minutes, at which point 214 mls of methylene chloride were added with continual stirring at 25° C. The catalyst, 0.4 ml of triethylamine was added, along with 0.05 gms of phenolphthalein indicator. The flask was partly submerged in a cold water bath as an aid for control of the reaction temperature, then phosgenation carried out at a rate of about 1.4 gms/min.

Phosgene gas was fed in, maintaining a reaction temperature of 25° C and when the phenolphthalein color change occurred, 14 mls of caustic solution were added with continued phosgenation. The 14 ml. caustic additions were made two more times. A final addition of caustic 5.0 mls at the color change was made with continued phosgene addition until a total of about 42 grams of phosgene had been fed in.

Then the contents were allowed to stir and digest at 25° C for 30 minutes. The stirrer, at this point, was stopped, allowing the reactants to phase out into two layers. The top layer being the salt water and excess caustic, having a pH of about 9.0 measured by pH paper. The heavy layer contained the methylene chloride polymer solution plus some water. The light layer was siphoned off, additional water was added, stirred, then siphoned off again. The polymer solution was acidified with HCl then diluted with additional methylene chloride so that better agitation could be obtained, then transferred to a separatory funnel for 12 hours. At this point, the polymer solution was almost clear.

This solution was filtered through diatomaceous earth, resulting in a clear colorless solution which was precipitated in N-hexane to remove the white polycarbonate particles. The polymer was filtered and dried in a vacuum oven at 110° for 8 hours. The dried polymer was molded in a press at 600° F resulting in a tough high impact type, clear, plastic having the following properties.

Following the procedures set forth above, the examples and controls set forth in Table I were prepared.

TABLE I

| Example | Grams Terminator | Terminator | Mol. Wt. (G.P.C.) |
|---|---|---|---|
| 1 | 3 | $Na_2SO_3$ (sodium sulfite) | 78,335 |
| 2 | 3.5 | $Na_2SO_3$ (sodium sulfite) | 28,315 |
| 3 | 4.0 | $Na_2SO_3$ (sodium sulfite) | 19.446 |
| 4 | 9.0 | $Na_2S_2O_4$ (sodium hyposulfite) | 13,532 |
| 5 | 11.0 | $MgSO_3$ (magnesium sulfite) | 48,754 |
| 6 | 14.0 | $MgSO_3$ (magnesium sulfite) | 30,753 |
| 7 | 15.0 | $MgSO_3$ (magnesium sulfite) | 26,443 |
| 8 | 16.0 | $MgSO_3$ (magnesium sulfite) | 20,148 |
| Control 1 | 0 | none | >100,000 |
| Control 2 | 3.8 | $Na_2S$ (sodium sulfide) | >100,000 |
| Control 3 | 20.0 | $CaCl_2$ (calcium chloride) | >100,000 |
| Control 4 | 17.0 | $Na_2SO_4$ (sodium sulfate) | >100,000 |
| Control 5 | 18.0 | $NaH_2PO_2$ (sodium hypophosphate) | >100,000 |
| Control 6 | 10.0 | $NaH_2PO_4$ (monosodium phosphate) | >100,000 |
| Control 7 | 12.0 | $Na_2S_2O_6$ (sodium dithionate) | >100,000 |
| Control 8 | 9.0 | $Na_2S_2O_8$ (sodium peerslfate | >100,000 |

The foregoing examples show that the metallic salts of this invention unexpectedly are able to control the molecular weight of polycarbonates when used during the preparation thereof. Other salts, which are not the salts of this invention even though clearly related, do not control the molecular weight since the molecular weight of the final polycarbonates rises to a weight average molecular weight over 100,000. This is undesirable since the polycarbonates so prepared are difficult, if not impossible, to mold into useful shapes. A further unexpected discovery is that although the metallic salts of this invention appear to control the chain termination of the polycarbonates, they do not become a part of the final polycarbonate since exhaustive analysis of the polycarbonates has failed to reveal any trace of sulfur or metal in the polymer molecules. The terminal groups of the polycarbonates prepared by the method of this invention rather than being terminated by sulfite, pyrosulfite or hyposulfite end groups are unexpectedly terminated by hydroxyl groups.

What I claim is:

1. A process for controlling the molecular weight of thermoplastic aromatic polycarbonates having hydroxyl terminated end groups which comprises reacting under interfacial polycarbonate-forming conditions
   1. a carbonyl halide,
   2. a dihydric phenol or mixtures of dihydric phenols,
   3. a catalyst useful to form polycarbonates and
   4. a chain terminating amount of a compound having one of the formulas

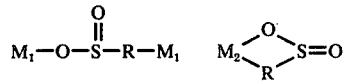

wherein $M_1$ is a metal of Group IA, $M_2$ is a metal of Group IIA, R is

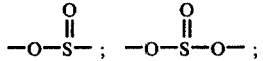

or —O—.

2. The process as set forth in claim 1 wherein the amount of chain terminator compound used is such that the weight percent range of chain terminator to the dihydric phenol is in the range from about 1.0 to about 25.

3. The process as set forth in claim 2 wherein the chain terminating compound has the formula

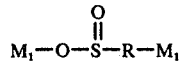

wherein $M_1$ is a metal of Group IA, R is

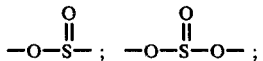

or —O—.

4. The process as set forth in claim 3 wherein the amount of chain terminator used is such that the weight percent range of chain terminator to the dihydric phenol is in the range from about 3 to about 15.0.

5. The process as set forth in claim 4 wherein the chain terminating compound is an alkali metal sulfite.

6. The process as set forth in claim 5 wherein the compound is sodium sulfite.

* * * * *

UNITED STATES PATENT AND TRADEMARK OFFICE
CERTIFICATE OF CORRECTION

PATENT NO. : 4,020,045
DATED : April 26, 1977
INVENTOR(S) : Joseph M. Baggett

It is certified that error appears in the above-identified patent and that said Letters Patent are hereby corrected as shown below:

Col. 1, line 16; should read "the solubility of the organic...."

Col. 1, line 22; correct spelling of "discoloration"

Col. 1, line 26; delete "the"

Col. 1, line 56; add space between "10,000" and "to"

Col. 2, line 56; change "$-\overset{\overset{O}{\|}}{\underset{\underset{O}{\|}}{S}}-S-$" to $-\overset{\overset{O}{\|}}{\underset{\underset{O}{\|}}{S}}-$, Col. 3, line 19; should read "4,4-bis (4-hydroxyphenyl) heptane"

Col. 3, line 30; should read "...4-hydroxyphenyl..."

Col. 3, lines 48 and 49; should read as two compounds on separate lines i.e.

3,3'-dichloro'4,4'-dihydroxydiphenyl
3,3'-diethyl-4,4'-dihydroxydiphenyl

Col. 3, line 57; should read "...4-hydroxyphenyl..."

UNITED STATES PATENT AND TRADEMARK OFFICE
CERTIFICATE OF CORRECTION

PATENT NO. : 4,020,045
DATED : April 26, 1977
INVENTOR(S) : Joseph M. Baggett

It is certified that error appears in the above-identified patent and that said Letters Patent are hereby corrected as shown below:

Col. 4, line 30; should read "75 gms"

Col. 5, line 34; should read "sodium persulfate"

Signed and Sealed this

First Day of November 1977

[SEAL]

Attest:

RUTH C. MASON
*Attesting Officer*

LUTRELLE F. PARKER
*Acting Commissioner of Patents and Trademarks*